United States Patent [19]

Hirata et al.

[11] Patent Number: 5,535,361
[45] Date of Patent: Jul. 9, 1996

[54] CACHE BLOCK REPLACEMENT SCHEME BASED ON DIRECTORY CONTROL BIT SET/RESET AND HIT/MISS BASIS IN A MULTIHEADING MULTIPROCESSOR ENVIRONMENT

[75] Inventors: Hiroaki Hirata, Kyoto; Kozo Kimura, Osaka, both of Japan

[73] Assignee: Matsushita Electric Industrial Co., Ltd., Osaka, Japan

[21] Appl. No.: 66,709

[22] Filed: May 24, 1993

[30] Foreign Application Priority Data

May 22, 1992 [JP] Japan .................. 4-130442

[51] Int. Cl.$^6$ .................................. G06F 12/08
[52] U.S. Cl. .................. 395/472; 364/DIG. 1; 364/228.1; 364/243.41; 364/246; 395/447; 395/448; 395/485; 395/460
[58] Field of Search ............. 364/200 MS File, 364/900 MS File; 395/200, 425, 275, 375, 400, 425, 447–448, 472, 485, 460, 200.08

[56] References Cited

U.S. PATENT DOCUMENTS

| | | | |
|---|---|---|---|
| 4,484,267 | 11/1984 | Fletcher | 395/425 |
| 4,807,110 | 2/1989 | Pomerene et al. | 395/425 |
| 4,843,542 | 6/1989 | Dashiell et al. | 395/425 |
| 4,882,642 | 11/1989 | Tayler et al. | 360/78.11 |
| 4,885,680 | 12/1989 | Anthony et al. | 395/425 |
| 4,928,225 | 5/1990 | McCarthy et al. | 395/425 |
| 5,179,702 | 1/1993 | Spix et al. | 395/650 |
| 5,185,875 | 2/1993 | Chinnaswamy et al. | 395/425 |
| 5,297,269 | 5/1994 | Donaldson et al. | 395/425 |
| 5,313,609 | 5/1994 | Baylor et al. | 395/425 |
| 5,430,850 | 7/1995 | Papadopoulos et al. | 395/375 |

FOREIGN PATENT DOCUMENTS

| | | |
|---|---|---|
| 289145 | 3/1990 | Japan . |
| 363851 | 3/1991 | Japan . |
| 4288647 | 10/1992 | Japan . |
| 4315235 | 11/1992 | Japan . |

OTHER PUBLICATIONS

Kurihara, K., "Latency tolerance through multi-threading in large-scale multiprocessors" (Proceedings of the International Symposium on Shared Memory Multiprocessing 7, pp. 91–101, Publication Date 1991.

Vuong-Adlerberg, I., "Cache for Multi-Threaded Processors on a Split-Transaction Bus" (MIT Cambridge Lab. for Computer Science, Report No.:MIT/LCS/TR–466), Nov. 1989.

"April: A Processor Architecture for Multiprocessing", in Proceedings of the 17th Annual International Symposium on Computer Architecture, pp. 104–114, 1990 Agarwal, Lim, Kranz, Kubitatowiz.

Lenonski, Lavdon, Gharachorloo, Gupta, Hennessy "The Directory–Based Cache Coherence Protocol for the DASH Multiprocessor", 1990, pp. 148–159.

"Synchronization, Coherence, and Event Ordering in Multiprocessors", 1988, pp. 9–21 Dubois and Schevrich.

Primary Examiner—Matthew M. Kim
Attorney, Agent, or Firm—Price, Gess & Ubell

[57] ABSTRACT

A cache controller for a multithreading multiprocessor system which starts an execution of another thread by suspending an ongoing execution of a thread when a cache miss happens. The cache controller comprises a cache directory unit for storing cache managing data including a footprint bit to indicate a mapping relation between at least one cache block in a main memory block, an access control unit for searching the directory unit based on an access requesting message inputted thereto through its input/output port connected to a processor to return one of a cache hit notice and a cache miss notice, as well as transferring messages with the main memory through its input/output port connected to a network, and a footprint bit changing device for setting the footprint bit in the cache managing data corresponding to a cache block at a cache hit, while resetting the footprint bit upon input of a positive responding message through the input/output port connected to the network to a fetch requesting message which has been sent therethrough at a cache miss.

8 Claims, 8 Drawing Sheets

Footprint Bit P

| Input | | Output |
|---|---|---|
| Wr | H | P |
| 01 | 1 | 1 |
| 10 | 1 | 1 |
| 11 | 1 | 1 |
| 00 | * | Pin |
| ** | 0 | Pin |

Fig. 6B

Reservation Bit R

| Input | | Output |
|---|---|---|
| Wr | H | R |
| 01 | 1 | Rin |
| 10 | 1 | 1 |
| 11 | 1 | 1 |
| 00 | * | Rin |
| ** | 0 | Rin |

FIG. 6C

Thread Identifier Field ID

| | Input | Output | |
|---|---|---|---|
| Condition | H | S | ID |
| IDin = CID | 1 | 1 | CID |
| IDin = CID | 1 | Sin | CID |
| any case | 0 | Sin | IDin |

\* = Don't care

| Way 0 | | | | | Way 1 | | | | | Block for Replacement |
|---|---|---|---|---|---|---|---|---|---|---|
| N | R | P | S | L | N | R | P | S | L | |
| 0 | * | * | * | * | 1 | * | * | * | * | Way 0 |
| 1 | * | * | * | * | 0 | * | * | * | * | Way 1 |
| = | 0 | * | * | * | = | 1 | * | * | * | Way 1 |
| = | 1 | * | * | * | = | 0 | * | * | * | Way 0 |
| = | = | 0 | * | * | = | = | 1 | * | * | Way 1 |
| = | = | 1 | * | * | = | = | 0 | * | * | Way 0 |
| = | = | = | 0 | * | = | = | = | 1 | * | Way 0 |
| = | = | = | 1 | * | = | = | = | 0 | * | Way 1 |
| = | = | = | = | 0 | = | = | = | = | 1 | Way 0 |
| = | = | = | = | 1 | = | = | = | = | 0 | Way 1 |

CACHE BLOCK REPLACEMENT SCHEME BASED ON DIRECTORY CONTROL BIT SET/RESET AND HIT/MISS BASIS IN A MULTITHEADING MULTIPROCESSOR ENVIRONMENT

BACKGROUND OF THE INVENTION

1. Field of the Invention

The present invention relates to a cache controller that controls a cache attached to each processor in a multiprocessor system.

2. Description of the Related Art

In recent years, a parallel processing system using a plurality of processors, a so-called multiprocessor system, has been adopted to data processors such as computers to enhance throughput thereof.

However, as the scale of multiprocessor systems becomes larger, latency of data access to main memories is further prolonged, making it difficult to enhance throughput. The latency partly depends on the construction of the network connecting the processors and main memories. Accordingly, the prior art devised and attached a cache to each processor to shorten the latency. Once a cache miss happens, however, the processor requesting access to the main memories is left idle until the needed data is loaded into the cache, and thus a reduced processing speed also makes it difficult to enhance throughput.

Given these circumstances, multithreading processing was proposed as an architecture that can enhance throughput by hiding the latency. An example is described in "Proceedings of the 17th Annual International Symposium on Computer Architecture", IEEE, pp. 104–114, 1990.

According to this type of processing, each processor suspends an ongoing execution of a thread (a unit of a program per execution, or namely an instruction stream) when a cache miss happens, and starts an execution of another thread while requesting data access to the main memories. By doing so, the processor can enhance throughput with a continuous operation. Such enhancement is limited when conventional caches are used in a uniprocessor or the multiprocessor system. Because of these caches, it unavoidably takes a certain time to resume the execution of the once-suspended thread since the data has been loaded into the cache. A cache miss thus may happen again if another thread has replaced a block (a set of data in 64–128 bytes) containing the data with another during that certain time, thereby decreasing an overall processing speed. Yet, neither a construction nor a controlling method of a cache suitable for the multithreading processing has been disclosed to date.

SUMMARY OF THE INVENTION

Accordingly, the present invention has an object to provide a cache controller for a multithreading multiprocessor system which can prevent access interference among the threads to avoid the cache miss, and which enables implementation of sophisticated synchronization primitives in the system.

The above object is fulfilled by a cache controller for a multithreading multiprocessor system which starts an execution of another thread by suspending an ongoing execution of a thread when a cache miss happens. The cache controller comprises a cache directory unit for storing cache managing data including a footprint bit to indicate a mapping relation between at least one cache block and a main memory block, an access control unit for searching the directory unit based on an access requesting message inputted thereto through its input/output port connected to a processor to return one of a cache hit notice and a cache miss notice, as well as transferring messages with the main memory through its input/output port connected to a network, and a footprint bit changing device for setting the footprint bit in the cache managing data corresponding to a cache block at a cache hit, while resetting the footprint bit upon input of a positive responding message through the input/output port connected to the network to a fetch requesting message which has been sent therethrough at a cache miss.

The cache controller may further comprise a cache block replacing device for selecting a cache block of which footprint bit is set so that a higher priority is given to the cache block over a cache block of which footprint bit is not set.

The cache managing data may include a thread identifier field, and the cache block replacing device may be designed to compare a value of the thread identifier field with that of a current thread identifier included in the access requesting message, so that a lower priority is given to the cache block when the two values match.

The cache managing data may further include a sharing bit, and the cache controller may further include a sharing bit changing device, and the sharing bit changing device may be designed to set the sharing bit when a value of the current field identifier included in the access requesting message and that of thread identifier field do not match.

The cache block replacing device may be designed to select a cache block of which sharing bit in the cache managing data is reset antecedently to a cache block of which sharing bit is set.

According to the above construction, the cache controller can store data for each cache block as to whether the cache block has ever had an access; for it sets the footprint bit in the cache managing data when it receives the access requesting message from the processor at the cache hit, while it resets the footprint bit when the requested data has been loaded into the cache at the cache miss.

Moreover, a higher priority is given to the cache block of which footprint bit is set, so that the cache block which has never had access is left in the cache. Likewise, a lower priority is given to the cache block of which thread identifier field has the same value as the current thread identifier, so that the cache block having access to an ongoing thread is left in the cache.

Furthermore, the values of the thread identifier field and the current thread identifier are compared when the sharing bit is set, and only when they do not match, the sharing bit is reset at the cache hit, so that lower priority is given to the cache block to which other caches have access.

The above object is also fulfilled by a cache controller for a multithreading multiprocessor system which starts an execution of another thread by suspending an ongoing execution of a thread when a cache miss happens. The cache controller comprises a cache directory unit for storing cache managing data including a reservation bit to indicate a mapping relation between at least one cache block and a main memory block, an access control unit for searching the directory unit based on an access requesting message inputted thereto through its input/output port connected to a processor to return one of a cache hit notice and a cache miss notice, as well as transferring messages with the main memory through its input/output port connected to a network, and a reservation bit changing device for setting the reservation bit in the cache managing data corresponding to a cache block at a cache hit, while resetting the reservation bit upon input of a positive responding message through the input/output port connected to the network to a fetch requesting message which has been sent therethrough at a cache miss.

The cache controller may further comprise a cache block replacing device for selecting a cache block of which reservation bit is set antecedently to a cache block of which reservation footprint bit is not set.

The access control unit may include a responding message generating device for outputting a positive responding message upon receipt of an ownership requesting message through the input/output port connected to the network when the reservation bit is set, as well as outputting a negative responding message when the reservation bit is reset.

The cache managing data may further include a rejection bit, and the cache controller may further include a rejection bit changing device for setting the rejection bit upon output of the negative responding message to the ownership-transfer requesting message, and the responding message generating device may be designed to output a writing completion message through the input/output port connected to the network upon transition of the reservation bit's state from reset to set when the rejection bit is set.

According to the above construction, the cache controller can store data for each cache block as to whether any data has been written into the cache block; for it sets the reservation bit upon receipt of a writing request from the processor at the cache hit, and resets it when the requested data has been loaded into the cache at the cache miss.

Also, given that any writing into the cache block to which no data has been written into is prohibited, the cache coherence is safely maintained; for the cache controller returns the positive responding message to the ownership requesting message to the network when the reservation bit is set, and the negative responding message when not.

Moreover, other cache can learn when the ownership-transfer requesting message is acceptable; for the cache controller sets the rejection bit when it returns the negative responding message to the ownership-transfer requesting message to the network, and returns the notice of the completion of writing to other processors requesting the ownership-transfer while it sets the reservation bit when the rejection bit has been set.

Yet, the above object is fulfilled by a cache controller for a multithreading multiprocessor system which starts an execution of another thread by suspending an ongoing execution of a thread when a cache miss happens. The cache controller comprises a cache directory unit for storing cache managing data including a reservation bit to indicate a mapping relation between at least one cache block and a main memory block, an access control unit for searching the directory unit based on an access requesting message inputted thereto through its input/output port connected to a processor to return one of a cache hit notice and a cache miss notice, as well as transferring messages with the main memory through its input/output port connected to a network, and a reservation bit changing device for setting the reservation bit in the cache managing data corresponding to a cache block at a cache hit based on a synchronous requesting message inputted thereto through the input/output port connected to the processor, while resetting the reservation bit upon input of a positive responding message through the input/output port connected to the network to a fetch requesting message which has been sent therethrough at a cache miss, and for not resetting the reservation bit upon input of a readout requesting message inputted thereto through the port connected to the processor.

According to the above construction, the cache controller can maintain the ownership to the cache block even when it is readout; for the cache controller resets the reservation bit upon receipt of the synchronization requesting message from the processor at the cache hit, and resets the reservation bit when the requested data have been loaded into the cache at the cache miss, but it does not set the reservation bit upon the readout requesting message from the processor.

Furthermore, the above object is fulfilled by a cache controller used for a multithreading multiprocessor system which starts an execution of another thread by suspending an ongoing execution of a thread when it has a cache miss. The cache controller comprises an access control unit for transferring messages between a processor and a network through its input/output port connected to the processor and its input/output port connected to the network and a rejection record storing unit for storing data of rejection history by referring data outputted from the access control unit, wherein the access control unit is designed to control the rejection data storing unit to store data of a negative responding message upon receipt thereof through the input/output port connected to the network, and to output an ownership requesting message through the input/output port connected to the network upon detection of data of rejection history corresponding to a writing completion message in the rejection record storing unit by searching it upon receipt of the writing completion message.

According to the above construction, the amount of traffic through the network can be reduced; for the cache controller stores data of the negative responding message to the access requesting message, and does not send the access requesting message while the ownership-transfer requesting message is unacceptable, and it sends the access requesting message again upon receipt of the writing completion message.

According to the present invention, the cache controller for the multithreading multiprocessor system can prevent access interference among the threads to avoid the cache miss so that the cache hit ratio is increased. It can enhance working ratio by obviating excessive message-transfer for cache coherence protocol, and enables implementation of sophisticated read-modify-write primitives. As a result, not only overall throughput, but also the processing speed thereof are enhanced.

BRIEF DESCRIPTION OF DRAWINGS

These and other objects, advantages and features of the invention will become apparent from the following description thereof taken in conjugation with the accompanying drawings which illustrate a specific embodiment of the invention. In the drawings.

DESCRIPTION OF THE PREFERRED EMBODIMENT

Figure 1:
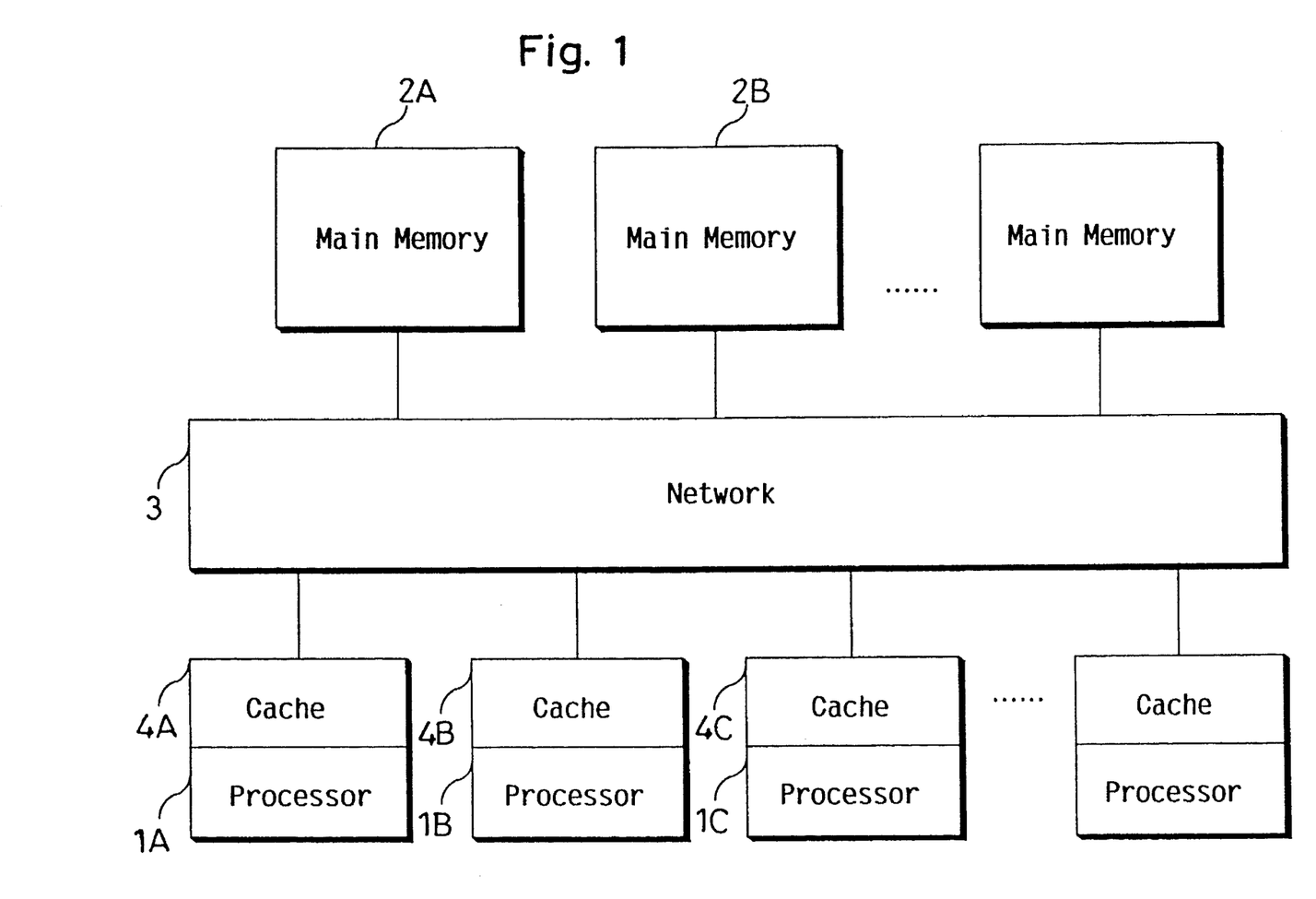
FIG. 1 is a block diagram of an example of a multiprocessor system using the cache controllers of the present invention.

An example of a multiprocessor system using cache controllers of the present invention is described with reference to FIG. 1.

Figure 2:
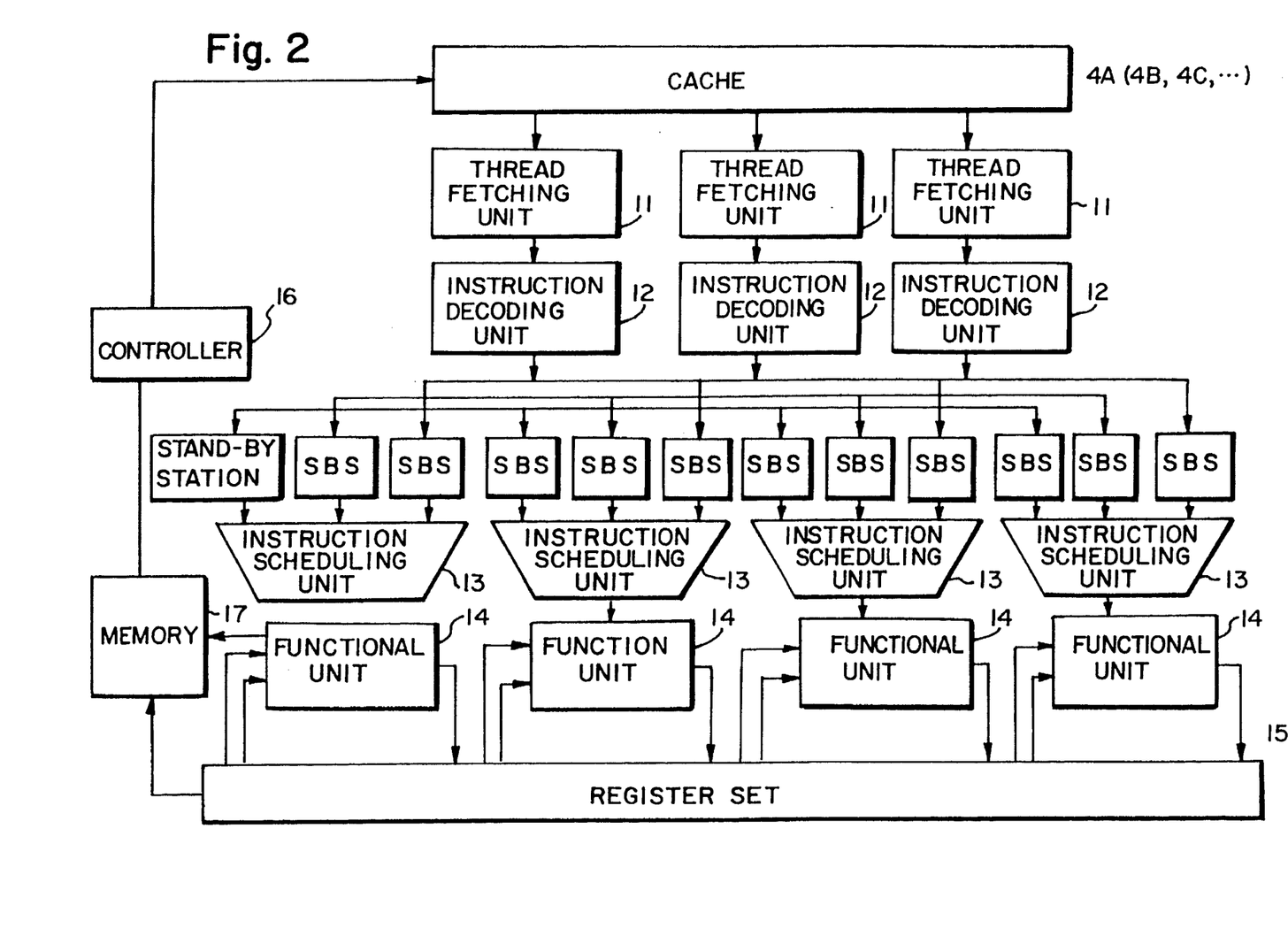
FIG. 2 is a schematic view of the processor.

The multiprocessor system comprises processors 1A, 1B, 1C . . . which are connected to main memories 2A, 2B . . . through a network 3, and caches 4A, 4B, 4C . . . attached to the processors 1A, 1B, 1C . . . , respectively. As shown in FIG. 2, each processor comprises thread fetching units 11 for respectively fetching threads from the cache, instruction decoding units 12 for decoding instructions from the respective thread fetching units 11, instruction scheduling units 13 for scheduling issuance and assignment of the decoded instructions to functional units 14 such as a load-store unit, a register set 15 for storing execution results of instructions, a controller 16 for supervising and controlling a cache miss, and a memory 17 for storing data in the functional unit 14 and register set 15 under the control of the controller 16.

More precisely, during the execution of a thread, the controller 16 supervises the cache miss in its cache. When a thread encounters a cache miss, the controller 16 suspends the execution of the thread, and saves the unfinished instructions of the thread that remain in the load-store unit 14 and contents of the register set 15 allocated to the thread into the memory 17. By doing so, the controller 16 prevents an interlock in the load-store unit 14 while enabling the processor to execute another thread to enhance throughput. The data saved in the memory 17 are restored when a cache miss occurs in another thread, so that the processor can resume the once-suspended thread from the point of suspension. To resume the once-suspended thread, it is necessary to identify the thread fetching unit 11 that has fetched this thread. For this reason, the controller 16 is designed to compare an ID mark of the load-store instruction in the load-store unit 14 with that of the fetched thread. The detailed construction of the processors is disclosed in Japanese Patent Application No. 4-124910 filed on May 18, 1992 by the inventor of the present invention.

Figure 3:
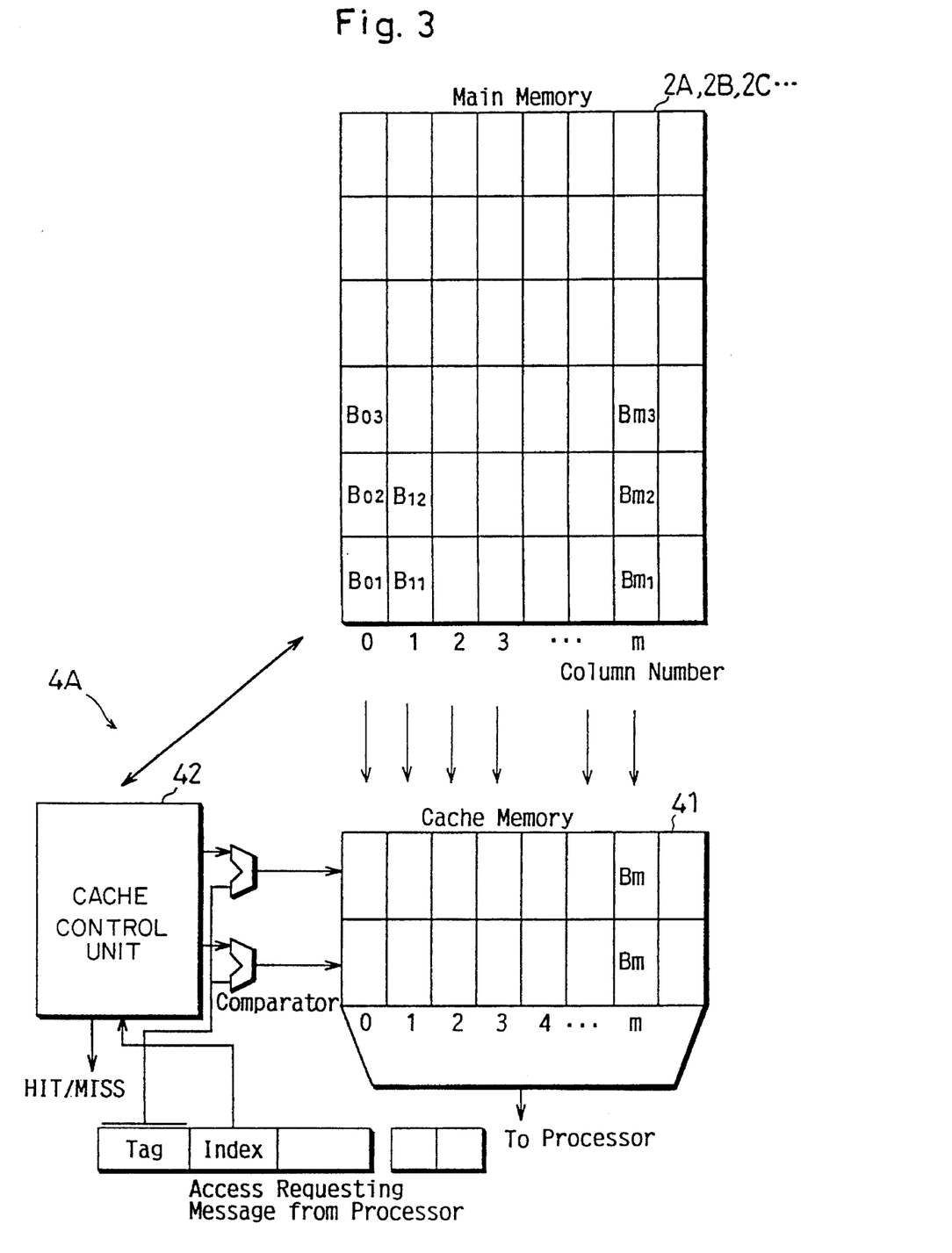
FIG. 3 is a schematic view of the cache.

In this embodiment, 2-way set associative caches are used as the caches 4A, 4B . . . , and as is shown in FIG. 3, each of them consists of a cache memory 41 and a cache control unit 42: the cache memory 41 can store up to 2 blocks $B_{m1}$ and $B_{m2}$ arbitrarily selected from a group consisting of blocks in the columns 0, 1, 2 . . . of the main memories. The cash control unit 42 manages the mapping relations between cache blocks and main memory blocks, as well as replying a cache hit or cache miss to the processor requesting an access to the concerned block. Although there are a plurality of the main memories in FIG. 1, they are deemed to constitute one massive memory as shown herein grounding that column numbers are given serially therethrough.

Figure 4:
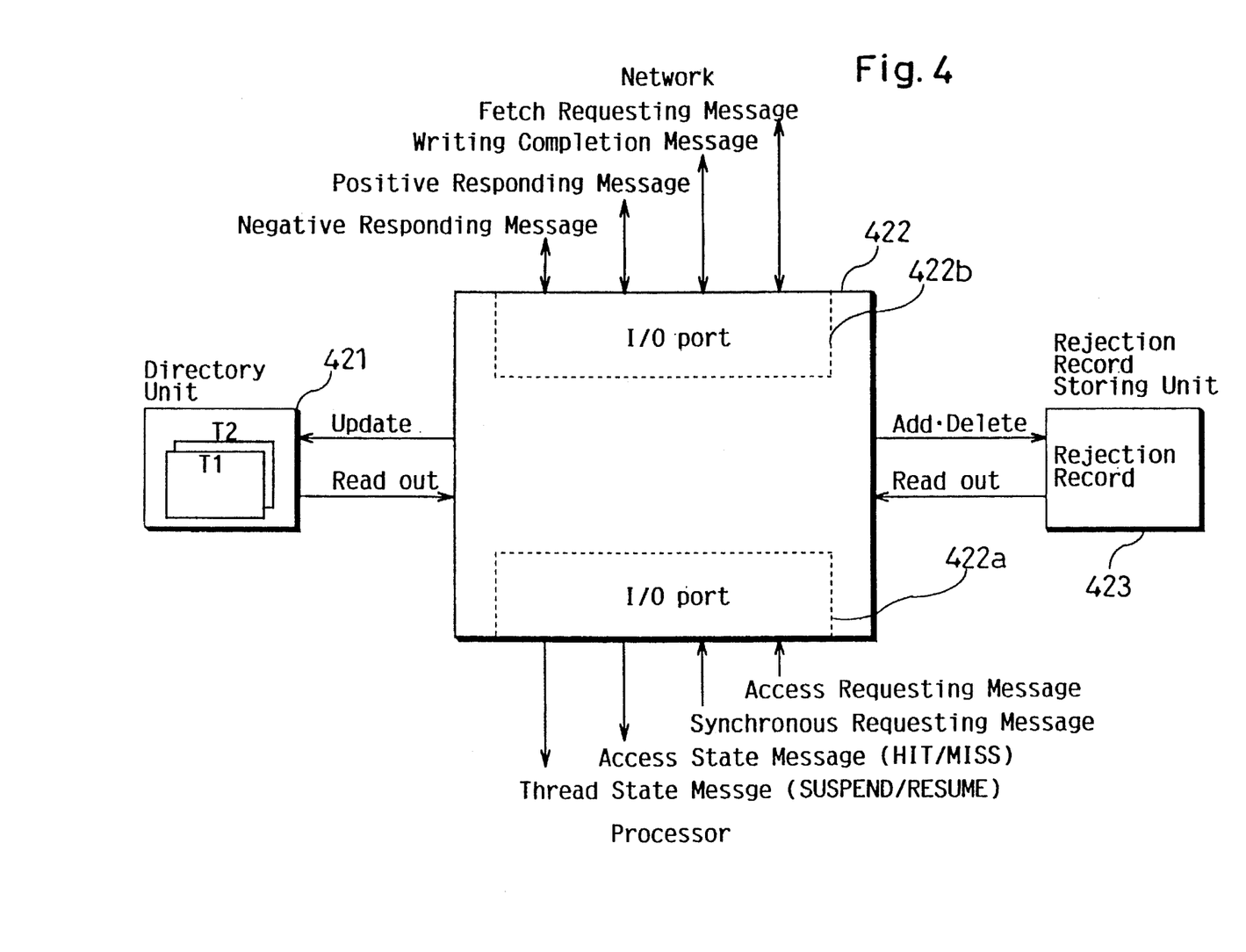
FIG. 4 is a block diagram of the cache controller.

More precisely, as is shown in FIG. 4, the cache control unit 42 comprises a directory unit 421 including tag arrays $T_1$ and $T_2$ whose entries contain managing data $I_1, I_2 \ldots$ for respective blocks (there is 1 array for each way), a main controller 422 for transferring messages between the processors and the main memories by way of the network through its input/output port 422a (I/O port 422a) connected to the processors and its input/output port 422b (I/O port 422b) connected to the network, and a rejection record storing unit 423.

Figure 5:
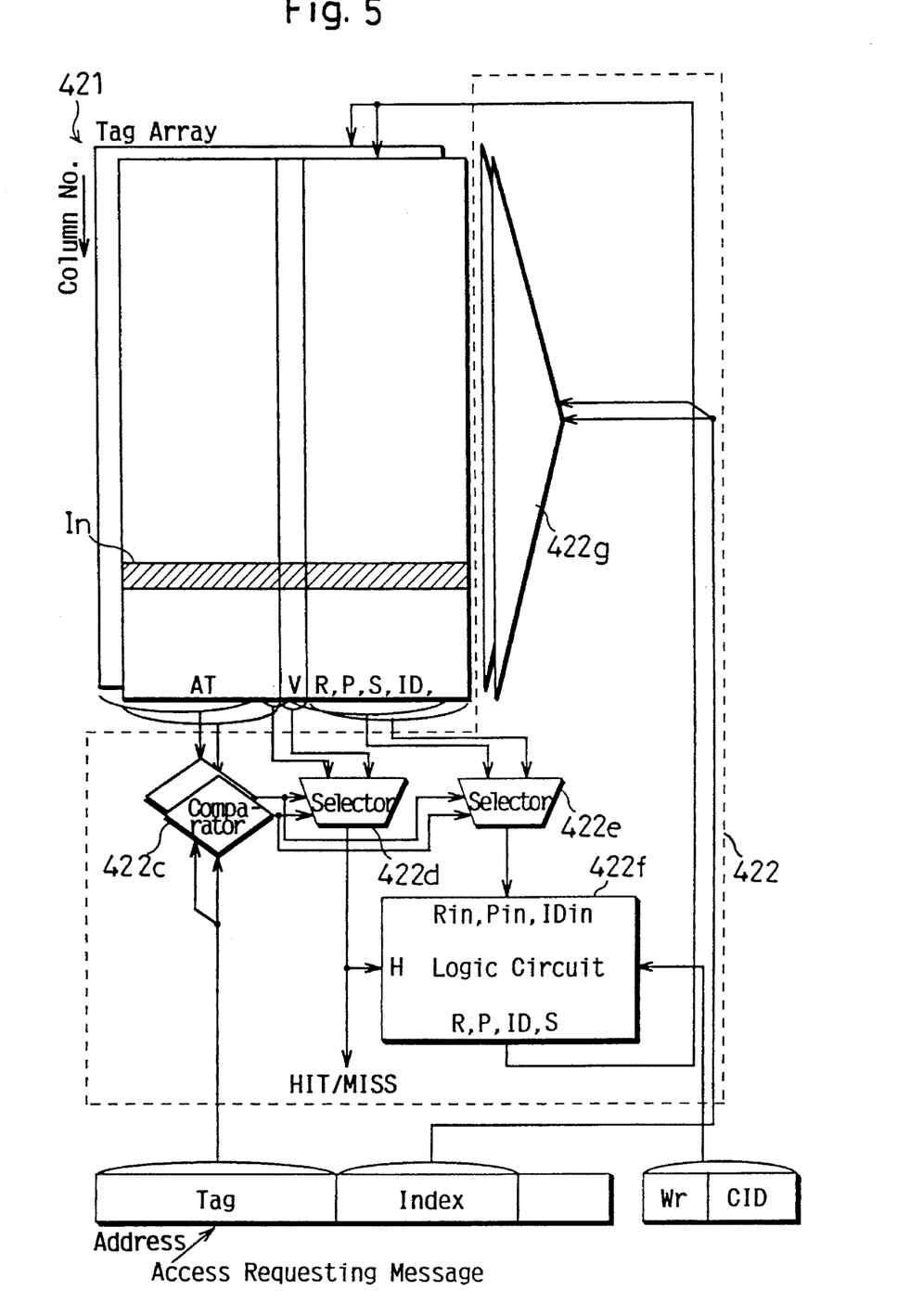
FIG. 5 is a view explaining the operation of the cache controller when transferring messages with the processor.

As shown in FIG. 5, each of the managing data $I_1, I_2 \ldots$ (managing data $I_i$) is stored in an area having the corresponding column number in the respective tag arrays $T_1$ and $T_2$, and it consists of an address tag field AT, a valid bit V, a footprint bit P, a reservation bit R, a sharing bit S, a thread identifier field ID, and a rejection bit J. All of these bits except the valid bit V and the address tag field AT are devised for the present invention, and they are used as follows:

The footprint bit P is used to indicate whether any data item included in the block corresponding to the managing data $I_i$ has ever been accessed from the processor since the block was loaded into the cache. If so, it is set so that a higher priority is given to this block in block replacement which will be described in detail later. Otherwise, it remains unset so that a lower priority is given, for the block which has had no access before must be accessed in the future.

The reservation bit R is used to indicate whether any data has ever been written into the block in the cache. If so, it is set so that a higher priority is given to this block in the block replacement. Otherwise, it remains unset so that a lower priority is given. Although both the footprint bit P and reservation bit R are included in the managing data $I_i$ in this embodiment, they are not necessarily included together.

The sharing bit S is used to indicate whether the block of the managing data $I_i$ occupies a private area or an area shared with other threads in a processing space.

The thread identifier field ID is used to store an identifier of the thread which has accessed the block before. On the access, the value of the ID is compared with a current thread identifier CID included in an access requesting message from the processor. If they do not match, the block contains data shared with another thread which is either stored in or being executed by other functional units 14 at the moment of comparison.

The rejection bit J is used to indicate whether the processor has ever returned a negative response to an ownership request from the network. In other words, this bit is used to ensure the ownership protocol adopted to the multiprocessor system for a cache coherence.

The rejection record storing unit 423 stores a plurality of rejected data $N_i$'s indicating that the network has returned a negative response to an ownership-transfer request from the processor. Thus, if there is rejected data $N_i$ of the concerned block, the processor sends the ownership-transfer request to maintain the cache coherence only when it turns out to be acceptable, thereby minimizing the number of request transmission.

As previously explained, the main controller 422 transfers messages between the processors and the main memories by way of the network.

More precisely, messages sent from the processor to the main controller 422 through the I/O port 422a are the access requesting message including a readout requesting message and a writing requesting message, and a synchronization requesting message, and those sent by the main controller 422 to the processor therethrough are an access state message and a thread state message. Messages transferred between the network and the main controller 422 through the I/O port 422b are a fetch requesting message including a readout fetch requesting message and a writing fetch requesting message, a writing completion message, a positive responding message and a negative responding message.

The processor sends the readout requesting message at an execution of a load instruction, the writing requesting message at an execution of a store instruction, and the synchronization requesting message at an execution of a particular synchronization instruction to the main controller 422. On the other hand, the main controller 422 sends the access state message having either HIT or MISS to the processor to notify the cache hit or cache miss. As well, it sends the thread state message having either SUSPEND or RESUME to the processor to enable it to control the thread state. When the processor receives the thread state message having SUSPEND, it transits the state of the thread to WAITING from EXECUTION, and starts another thread in the state of READY. When it receives the thread state message having RESUME, it transits the state of the thread to READY from WAITING. For explanatory convenience, let the main controller 422 always send the thread state message having SUSPEND to the processor when the access state message has MISS therein.

The readout fetch requesting message requests data loading into the cache to the main memories and other cache controllers, and notifies them of such data loading for the purpose of readout in later time, and the writing fetch requesting message does so for the purpose of writing in later time. Hereinafter, the writing fetch requesting message received from the other caches is referred to as the ownership-transfer request, while the writing fetch requesting message sent out to acquire an exclusive writing right as the ownership request.

Also, writing completion messages notifies the other processors of data accessibility thereto. The positive responding message is a positive response and the negative responding message is a negative response to the ownership-transfer requesting messages.

Figure 7:
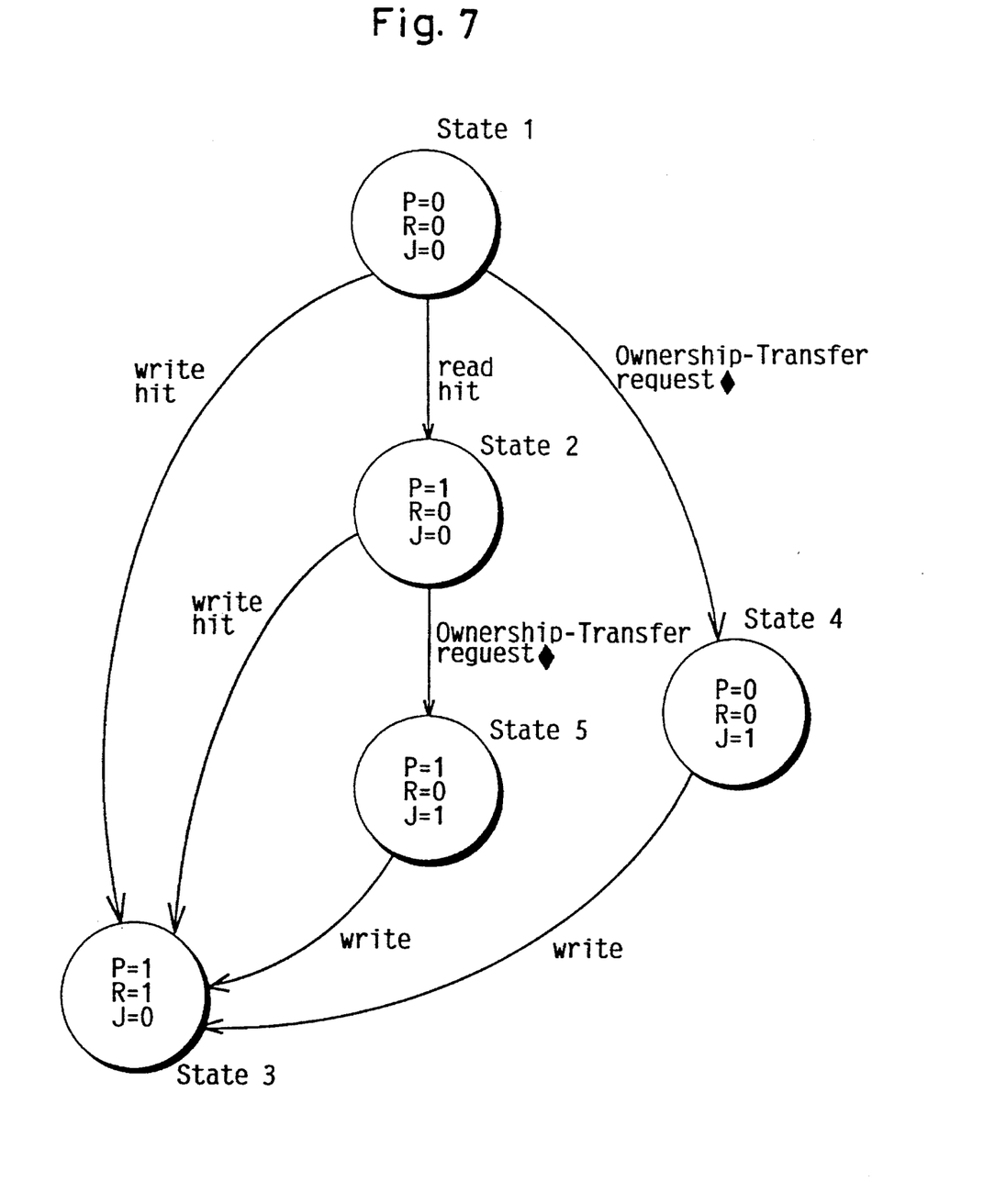
FIG. 7 is a bits' state-diagram explaining the operation of the cache controller when transferring messages with the network.

In FIGS. 5 and 7, the construction of the main controller 422 is depicted to explain how it transfers these messages. The former explains a message-transfer with the processor, and the latter explains a message-transfer with the network.

As shown in FIG. 5, the main controller consists of a comparator 422c, selectors 422d and 422e, a logic circuit 422f, and a column assigning unit 422g.

The comparator 422c compares the address tag field AT of a managing data $I_i$ with that of the access requesting message to judge if they match.

The selector 422d selects the valid bit V in the managing data $I_i$ based on the comparison result to notify the processor and logic circuit 422f of the cache hit or cache miss.

The selector 422e selects the footprint bit P, reservation bit R, sharing bit S, and thread identifier field ID, based on the comparison result to input them into the logic circuit 422f.

The logic circuit 422f updates the footprint bit P, reservation bit R, sharing bit S, and thread identifier field ID of the managing data $I_i$, based on the input from the selector 422d and 422e, and an access command Wr and the current thread identifier CID in the access requesting message. The method of update will be described later.

The column assigning unit 422g specifies the managing data $I_i$ corresponding to the access requesting message by comparing its column number and the index in the access requesting message.

Figure 6A:
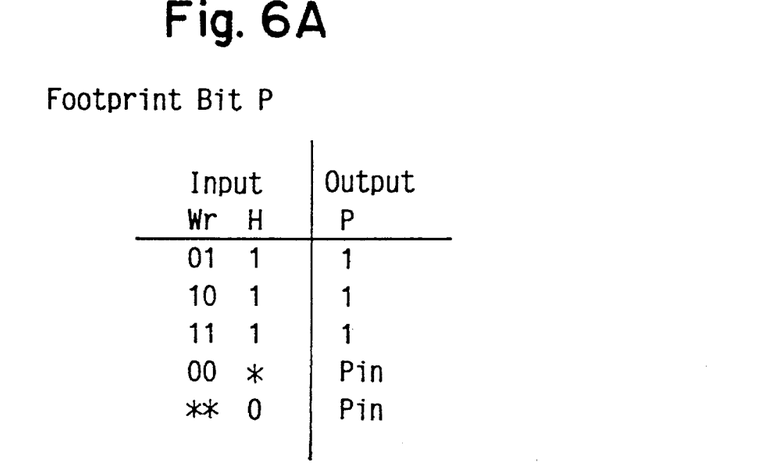
FIG. 6 contains three truth tables used in updating the footprint bit P, reservation bit R, and sharing bit S and thread identifier field ID.
Figure 6B:
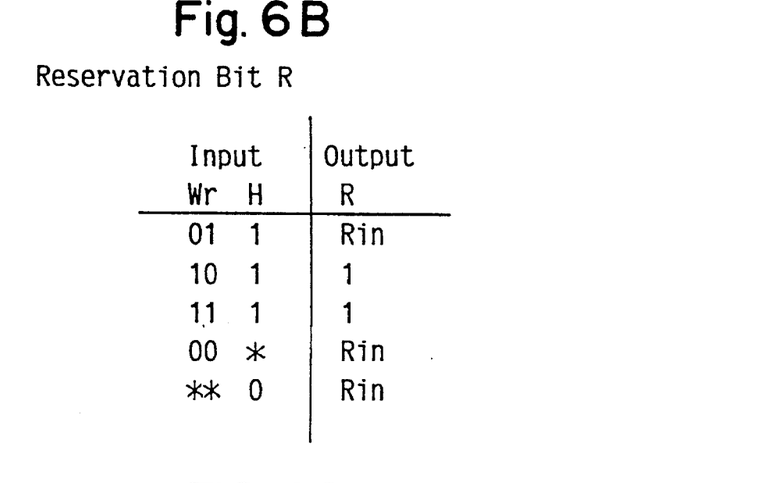
Figure 6C:
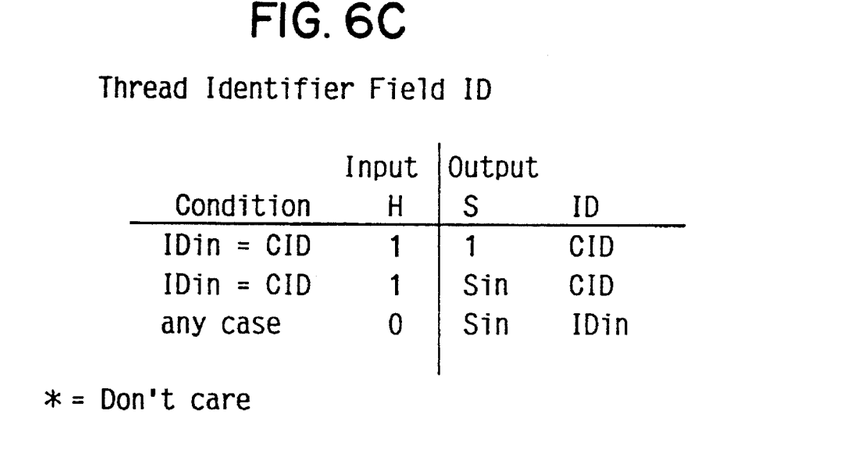

FIGS. 6(a), 6(b), and 6(c) are truth tables used to update the footprint bit P, reservation bit R, and sharing bit S and thread identifier field ID, respectively. Capital letters P, R, S, and ID denote the footprint bit P, reservation bit R, sharing bit S, and thread identifier field ID, respectively. A capital letter H denotes a cache hit. A 1 is given for a cache hit, and a 0 if given for a cache miss. The character '*' denotes Don't Care, that is, 'either 0 or 1 will do' and 'in' after capital letters means that values from the selector 422e are directly outputted from the logic circuit 422f. In addition, the 2-bit address command Wr is predetermined as shown in Table 1.

TABLE 1

| Wr | Access Command |
|---|---|
| 01 | Read |
| 10 | Write |
| 11 | Request ownership without writing |
| 00 | Null Access |

In FIG. 7, a state-diagram is used to depict how the main controller 422 controls the message-transfer. Although it is not an illustration of a circuit, it provides sufficient details for a person skilled in the art to construct a practical one. State 1 is the initial state, and a mark ♦ is attached to indicate that the processor has already secured the ownership. Cases where the mark is not attached are not discussed. Also, any event other than the direction of arrows is deemed to remain in the same state.

For further understanding, the operation of the main controller 422 through the message-transfer are explained with reference to FIGS. 5 and 7. It should be noted that the cache hit and cache miss used hereunder encompasses the cache coherence. For this reason, in case of a Write a Request Ownership Without Writing, the cache hit is asserted only if the needed data has already been loaded into the cache and the processor has secured the ownership. Otherwise, the cache miss is asserted. On the other hand, in case of a Read, the cache hit or miss is tested based only on the criterion of whether the needed data exists on the cache or not.

Upon Receipt of Readout Requesting Message

Upon receipt of the readout requesting message from the processor through the I/O port 422a, the main controller 422 starts to search for the corresponding managing data $I_i$ among the managing data $I_1, I_2, \ldots$ in the directory unit 421 to judge the cache hit or cache miss.

In case of the cache hit, the main controller 422 sets the footprint bit P and sends the access state message having HIT to the processor through the I/O port 422a, as well as setting the sharing bit S when the current thread identifier CID and the thread identifier field ID do not match.

On the other hand, in case of the cache miss, it sends the readout fetch requesting message to the network through the I/O port 422b, the access state message having MISS, and the thread state message having SUSPEND to the processor through the I/O port 422a.

Upon Receipt of Writing Requesting Message

Upon receipt of the writing requesting message from the processor through the I/O port 422b, the main controller 422 starts to search for the corresponding managing data $I_i$ among the managing data $I_1, I_2, \ldots$ in the directory unit 421 to judge the cache hit or cache miss.

In case of the cache hit, the main controller 422 sets both the footprint bit P and reservation bit R, and sends the access state message having HIT to the processor through the I/O port 422a, while setting the sharing bit S when the current thread identifier CID and the thread identifier field ID do not match. Also, when the rejection bit J has been set, it resets the rejection bit J while sending the writing completion message to the network through the I/O 422b.

On the other hand, in case of the cache miss, the main controller sends the ownership request to the network through the I/O port 422b, and the access state message having MISS as well as the thread state message having SUSPEND to the processor through the I/O port 422a.

Upon Receipt of Readout Fetch Requesting Message

The explanation of the operation upon receipt of the readout fetch requesting message from the network through the I/O port 422b is omitted herein; for the operation is ruled by the cache coherence protocol which is not the gist of the present invention.

Upon Receipt of Ownership Request

Upon receipt of the ownership request, the main controller 422 starts to search for the managing data $I_i$ among the managing data $I_1, I_2, \ldots$ in the directory unit 421 to judge the cache hit or cache miss.

In case of the cache hit, the main controller 422 sets the rejection bit J while sending the negative responding message to the network through the I/O port 422b when the reservation bit R has been reset, and the main controller 422 sends the positive responding message thereto when the reservation bit R has been set. Further explanation is omitted, for the operation is also ruled by the cache coherence protocol which is not the gist of the present invention.

In case of the cache miss, it terminates the execution.

Upon Receipt of Positive Responding Message

Upon receipt of the positive responding message to the fetch requesting message through the I/O port 422b, the main controller 422 loads the needed block into the cache through block replacement, while initializing the corresponding managing data $I_i$. At the initialization, the thread identifier field ID stores the value of the current thread identifier CID that causes the main controller 422 to send the fetch requesting message, whereby the footprint bit P, reservation bit R, sharing bit S, and negative bit J are all reset. However, the reservation bit R is reset only when the fetch requesting message is the ownership request. As well, it sends the current thread identifier CID of the thread causing it to send the fetch requesting message together with the thread state message having RESUME to the processor from the I/O port 422a.

Upon Receipt of Negative Responding Message

Upon receipt of the negative responding message to the fetch requesting message from the network through the I/O port 422b, the main controller 422 stores the rejected fetch requesting message as the rejection record into the rejection record storing unit 423.

Upon Receipt of Writing Completion Message

Upon receipt of the writing completion message from the network through the I/O port 422b, the main controller 422 starts to inspect whether the rejected record storing unit 423 stores any rejection record of the concerned block of the writing completion message.

If so, the main controller 422 generates the fetch requesting message by referring the rejection record and removes the rejection record from the rejection record storing unit 423 when it sends the fetch requesting message to the network; otherwise, the main controller 422 terminates the execution.

Upon Receipt of Synchronization Requesting Message

Upon receipt of the synchronization requesting message from the processor through the I/O port 422b, the main controller 422 starts to search for the corresponding managing data $I_i$ among the managing data $I_1, I_2, \ldots$ in the directory unit 421 to judge the cache hit and cache miss.

In case of the cache hit, the main controller 422 resets both the footprint bit P and reservation bit R, while sending the access state message having HIT to the processor through the I/O port 422a.

On the other hand, in case of the cache miss, the main controller 422 sends the ownership request to the network through the I/O port 422b, access state message having MISS, and thread state message having SUSPEND to the processor through the I/O port 422b.

With the cache controllers operating as above, atomic read-modify-write(RMW) primitives can be implemented. When a sequence of a synchronization instruction, a load thread, a computation instruction, and a store instruction is to be executed by the processor, it sequentially sends the synchronization requesting message, and readout requesting message, writing requesting message to the cache controller. Under these conditions, once the reservation bit R is reset in the managing data of the corresponding block by the synchronization requesting message, other caches are not allowed access to that block for the writing and synchronization instructions of their own. As a result, other cache controllers observe the sequence of the synchronization instruction and load instruction as if they were atomically executed. Likewise, given that the reservation bit R is not set by the following readout requesting message, the load instruction and store instruction are executed sequentially as if they were atomically executed. The other caches are allowed access to that block only when the reservation bit R is set by the writing requesting message.

Figure 8:
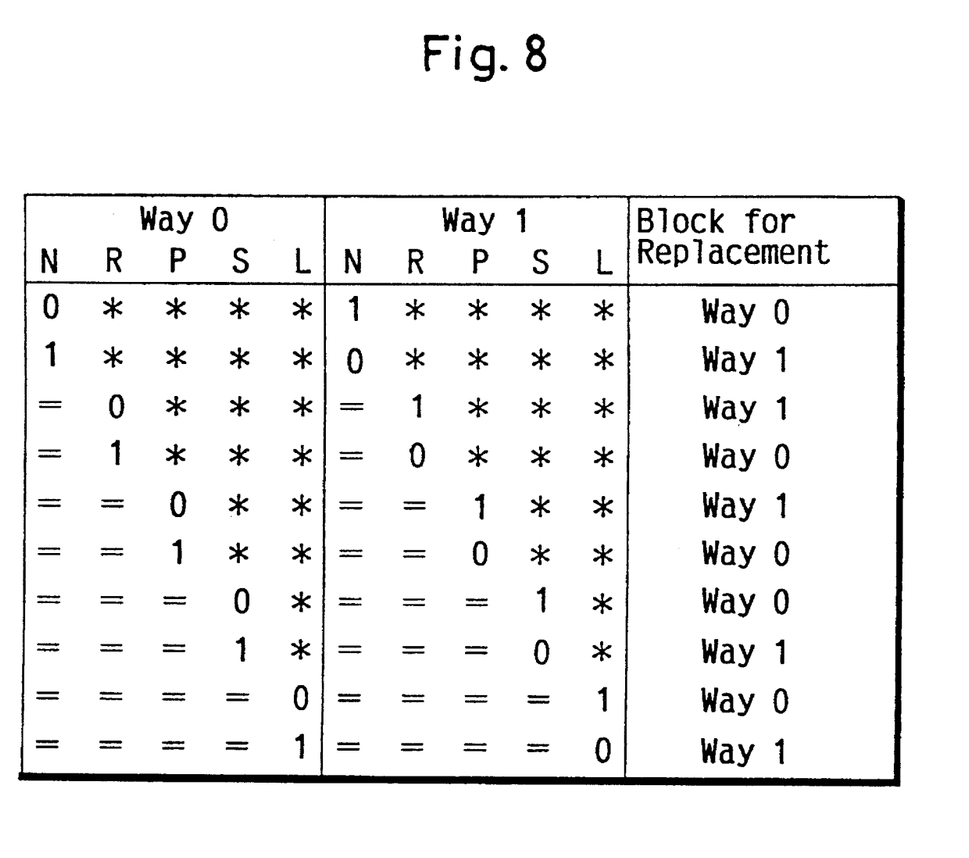
FIG. 8 is a table explaining how the block is selected for the block replacement.

Accompanied with above operations, the blocks in the cache can be replaced with one another. However, when the cache memory is full, the blocks therein must be removed to secure an area for a new block. When both blocks in a cache contain a valid data, the main controller 422 must decide which block should be removed. Shown in FIG. 8 is a principle to select a block to be replaced in such a case; the LRU (Least Recently Used) algorithm is employed herein, although the explanation thereof is omitted.

A capital letter N is the result of the comparison between the current thread identifier CID in the access requesting message and the thread identifier field ID; it has 1 when they match, and 0 when they do not. Capital letters P, R, and S denote the footprint bit P, reservation bit R, and sharing bit S, respectively, each having 1 when set and 0 when not set. A capital letter L denotes a bit of LRU; the bit of LRU accessed most recently has 1, and the other has 0. The character '*' denotes Don't Care, and the character '=' means that the corresponding bits in 2 blocks have the same value.

The main controller 422 inspects N's in the blocks of both ways first, and when they have different values, the block in the way having N=0 is removed, so that the block to which the ongoing thread has access is left in the cache. By doing so, the frequency of thread switching, and hence an unwanted overhead, can be reduced. When N's have the same value, the main controller 422 then inspects R's in the blocks of both ways, and when they have different values, the block in the way having R=1 is removed, so that the block that has had access before is removed; for the block that has not access is very likely to have access shortly. When R's have the same value, the main controller 422 then inspects P's in the blocks in both ways, and when they have different values, the block in the way having P=1 is removed, so that the block that has had access before is removed; for the block that has not had access is very likely to have access shortly. When P's have the same value, the main controller 422 then inspects S's in the block of both ways, and when they have different values, the block in the way having S=0 is removed, so that the block to which other caches have access is left in the cache to increase the overall hit ratio. When the bit N's, R's, P's and S's of the blocks of both ways have the same values, the block is chosen in the same manner as is done with conventional cache controllers employing LRU. The block in the way having L=0 is removed.

According to the present invention, the footprint bit P in the managing data facilitates detection as to whether the data in the cache have ever had access. The main controller 422 sets the footprint P upon receipt of the access requesting message through the I/O port 422a in case of the cache hit, and resets it upon receipt of the positive responding message to the fetch requesting message through the I/O port 422b in case of the cache miss.

The reservation bit R facilitates detection as to whether the data have been written into the block in the cachet. The main controller 422 sets the reservation bit R upon receipt of the writing requesting message through the I/O port 422a in case of the cache hit, and resets it upon receipt of the positive responding message to the fetch requesting message through the I/O port 422b.

The reservation bit R also facilitates the ownership-transfer while maintaining the cache coherence. Upon receipt of the ownership-transfer request through the I/O port 422b, the main controller 422 sends the positive responding message to the network through the I/O port 422b only when the reservation bit R has been set, and sends the negative responding message otherwise.

The rejection bit J facilitates arbitration of the ownership-transfer requesting messages by minimizing the number of the transmission thereof. The main controller 422 sets the rejection bit J only when the main controller 442 returns the negative response to the ownership-transfer request through the I/O port 422b. When the rejection bit J is set at the state transition of the reservation bit R from reset to set, the main controller 422 sends the writing completion message to the network through the I/O port 422b.

In addition, the reservation bit R enables the implementation of an atomic read-write (RW) operation. The main controller 422 resets the reservation bit R upon receipt of the synchronization requesting message through the I/O port 422a from the processor in case of the cache hit, and resets it upon receipt of the positive responding message replied to the ownership request from the network through the I/O port 422b in case of the cache miss. Once the reservation bit R is reset, it is not set upon receipt of the readout requesting message from the processor through the I/O port 422a.

Also, the rejection bit J can reduce the amount of traffic through the network by disallowing the network to repeatedly send the ownership-transfer request to the main controller 422. Upon receipt of the negative responding message thereto through the I/O port 422b, the main controller 422 controls the rejection record storing unit 423 to store the data of the negative responding message, and upon receipt of the writing completion message through I/O port 422b, it starts to inspect the rejection record of the writing completion message. Only when the rejection record storing unit 423 stores, it sends the writing fetch requesting message again through I/O port 422b.

The reservation bit R can reduce the number of context switching by leaving the block which has had no access before in the cache, which leads to increasing hit ratio and working rate of the system. A higher priority is given to the block whose reservation bit R has been set and to the one whose footprint bit P has been set in the block replacement.

Furthermore, the thread identifier field ID reduces the frequency of cache miss, and thread switching by leaving the block used by an ongoing execution of a thread. A lower priority is given to the block whose thread identifier field ID matches with the current thread identifier CID in the access requesting message.

The sharing bit S in addition to the thread identifier field ID also increase the overall hit ratio by leaving the block to which other threads also have access in the cache. The main controller 422 compares the thread identifier field ID with the current thread identifier CID when the sharing bit S has been reset; if they do not match, it sets the sharing bit S to give a lower priority to this block in the block replacement.

The reservation bit R can produce effects not only in the block replacement but also in the cache coherence, and unlike the footprint bit P, it is used for the purpose of writing only herein. It can, however, used for the purpose of readout as well. In addition, the reservation bit R is similar to a dirty bit in the sense that it stores the data as to the completion of the writing. They are, however, in principle different. Because the dirty bit is used to indicate whether the corresponding block in the main memories should also be updated or not, and thus can not play the same role of the reservation bit R.

The present invention is largely involved with the cache coherence protocol and block replacement algorithm; however, they are still independent and orthogonal inventions. Thus, the present invention can be modified by combination with other cache coherence protocols.

Although the present invention has been fully described by way of example with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. A cache controller for a multithreading multiprocessor which suspends an ongoing execution of a thread and starts an execution of another thread when a cache miss happens, the cache controller comprising:

a directory unit for storing management information indicating data blocks which are loaded from a main memory into a cache, the management information including a thread number field for storing thread reference numbers of threads which use the data blocks in the cache;

a data block replacing means for determining a data block having a highest replacing priority among the data blocks in the cache and replacing the data block having the highest replacing priority with a data block in the main memory;

an access control unit including a first input/output port and a second input/output port, the first input/output port transmitting and receiving an access requesting message which is one of a write requesting message and a read requesting message to and from said multithreading multiprocessor, and the second input/output port transmitting and receiving the access requesting message to and from the main memory and another cache controller, said access control unit for, on receiving the access requesting message from said multithreading multiprocessor, comparing a received thread reference number included in the received access requesting message with a thread reference number stored in said thread number field, and starting said data block replacing means by lowering a replacing priority of the data block indicated by the received thread reference number in a case where the thread reference numbers match.

2. The cache controller of claim 1, wherein said management information further includes footprint bits, each footprint bit being relevant to a corresponding data block in the cache; and said access control unit includes a footprint bit changing means for, on detecting a cache hit, of a specific data block setting a specific footprint bit corresponding to the specific data block, whereas, on detecting a cache miss of the specific data block, starting said data block replacing means by raising the replacing priority of the specific data block and resetting the specific footprint bit when a replacement of the specific data block has been completed.

3. The cache controller of claim 1, wherein said management information further includes sharing bits, each sharing bit being relevant to a corresponding data block in the cache; and said access control unit further includes a sharing bit changing means for, on detecting a cache hit of a specific data block, comparing a thread reference number stored in said thread number field with the received thread reference number included in the received access requesting message, and resetting the sharing bit in a case where the thread reference numbers do not match, and on detecting a cache miss of a specific data block, starting said data block replacing means by raising a replacing priority of the specific data block, and resetting the specific sharing bit when a replacement of the specific data block has been completed.

4. The cache controller of claim 1, wherein said management information further includes reservation bits, each reservation bit being relevant to a corresponding data block in the cache; and said access control unit further includes a reservation bit changing means for, on receiving the write requesting message from the processor for a specific data block, setting a specific reservation bit corresponding to the specific data block in a case where a cache hit of the specific data block is detected by retrieving said directory unit, and on detecting a cache miss of the specific data block, starting said data block replacing means by raising a replacing priority of the specific data block and resetting the specific reservation bit when a replacement of the specific data block has been completed.

5. The cache controller of claim 4, wherein said access control unit further includes a responding message generation unit for outputting a positive responding message upon receipt of the access requesting message from another cache controller through the second input/output port when the specific reservation bit is set, and outputting a negative responding message to the other cache controller when the specific reservation bit is reset.

6. The cache controller of claim 5, wherein said management information further includes negative bits, each negative bit being relevant to a corresponding data block in the cache;

said access control unit further including a negative bit change means for setting a specific negative bit when said responding message generation unit has outputted the negative responding message; and said responding message generation unit outputs an access completion message to the other cache controller which is a sender of the negative responding message if the specific negative bit is set when the reservation bit is transformed from a reset state to a set state.

7. The cache controller of claim 6, further comprising:

a rejection record storage unit for storing information of rejection history by referring data outputted from the access controlling unit;

on receiving the negative responding message in response to the access requesting message to the other cache controller, said access control unit stores the negative responding message to said negative history storage unit, and on receiving the access completion message from the other cache controller, retrieves said rejection history storage unit and reoutputs the access requesting message to the other cache controller when said rejection history storage unit has rejection history information corresponding to the access completion message.

8. The cache controller of claim 1, wherein said management information further includes preservation bits, each preservation bit being relevant to a corresponding data block in the cache; and said access control unit further includes a preservation bit changing means for, on receiving a synchronization requesting message from said multiheading multiprocessor, setting a specific reservation bit in a case where a cache hit of a corresponding specific data block is detected by retrieving said directory unit, and on detecting a cache miss, starting said data block replacing means by raising a replacing priority of the corresponding specific data block, resetting the preservation bit when a replacement of the corresponding specific data block has been completed, and not changing the preservation bit even if an access requesting message is received from said multiheading multiprocessor.

* * * * *